(12) United States Patent
Rey

(10) Patent No.: US 10,764,097 B1
(45) Date of Patent: Sep. 1, 2020

(54) FREQUENCY SHIFT KEYING (FSK) ERROR DETECTOR AND METHOD THEREFOR

(71) Applicant: NXP USA, INC., Austin, TX (US)

(72) Inventor: Claudio Gustavo Rey, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/292,408

(22) Filed: Mar. 5, 2019

(51) Int. Cl.
*H04L 27/144* (2006.01)
*H04L 27/00* (2006.01)

(52) U.S. Cl.
CPC ........ *H04L 27/144* (2013.01); *H04L 27/0014* (2013.01); *H04L 2027/0067* (2013.01)

(58) Field of Classification Search
CPC .................................................... H04L 27/144
USPC ........................................................ 375/334
See application file for complete search history.

(56) References Cited

U.S. PATENT DOCUMENTS

| 5,260,671 | A | * | 11/1993 | Iso | ...................... H04L 27/2331 |
| | | | | | 329/302 |
| 9,729,364 | B1 | | 8/2017 | Rey | |
| 2003/0043947 | A1 | * | 3/2003 | Zehavi | ................. H04B 1/7156 |
| | | | | | 375/365 |
| 2009/0238312 | A1 | * | 9/2009 | Shi | .......................... H04L 27/14 |
| | | | | | 375/344 |
| 2009/0258628 | A1 | * | 10/2009 | Lindoff | ............... H04L 27/0014 |
| | | | | | 455/302 |
| 2014/0003476 | A1 | * | 1/2014 | Xu | ...................... H04L 25/0224 |
| | | | | | 375/224 |

* cited by examiner

*Primary Examiner* — Lihong Yu

(57) ABSTRACT

A method includes, at a frequency shift keying (FSK) demodulator, determining a likelihood of a symbol having a first symbol value or a second symbol value, using the likelihood of the symbol to select either the first symbol value or the second symbol value for the symbol, the first symbol value or the second symbol value that is selected being a selected symbol value, selecting a frequency error from a first frequency error or a second frequency error, and using a down-mixer and the frequency error to correct a frequency drift associated with a future selected symbol value.

11 Claims, 5 Drawing Sheets

US 10,764,097 B1

FREQUENCY SHIFT KEYING (FSK) ERROR DETECTOR AND METHOD THEREFOR

BACKGROUND

Field of the Disclosure

Frequency shift keying (FSK) is a type of modulation technique that uses variations in the frequency of a transmitted carrier signal to modulate data onto the carrier signal. Because FSK relies heavily on the accuracy of the frequency of the carrier signal, any error or displacement in the frequencies relative to the center frequency caused by receiver and transmitter hardware (e.g., frequency synthesizers) or transmitter offset relative to the receiver can result in frequency deviation that negatively affects the correct demodulation of the transmitted signal. As a result, great importance is placed on ensuring an acceptable level of frequency accuracy in a FSK receiver in order to reduce the number of errors that may occur when demodulating the received signal. Thus, a frequency error tracking technique is desired that is able to appropriately reduce frequency deviation while minimizing the need for additional demodulation resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate systems and techniques for supporting frequency drift correction using frequency error tracking in a transmitter receiver system that uses frequency shift keying (FSK) modulation. A demodulator uses the phase output of correlation operations to estimate the frequency error in the transmitter receiver system. The frequency error estimate is used to compensate or adjust the frequency of the digital in-phase/quadrature (I/Q) samples to avoid errors caused by frequency drift during packet reception. The demodulator uses a frequency tracking feedback loop (frequency feedback loop) to minimize the frequency deviation detected while demodulating received data samples with a selected symbol value that is representative of a demodulated bit output by the demodulator. Using a frequency feedback loop based on, for example, a phase-delta-error and the corresponding frequency error, allows for precise correction and tracking of frequency errors that is continuously updated during the symbol demodulation process. The demodulation techniques illustrated herein improve upon existing demodulation techniques by providing a simple and effective way of tracking and recovering from frequency offsets and frequency drift normally associated with typical receivers.

For example, in a typical demodulation system, frequency error correction initially occurs during the signal acquisition process, at which time the original frequency error is estimated and corrected. However, frequency drift still occurs after the initial error estimation and correction of the frequency error. Using the disclosed demodulation techniques, in addition to providing the typical error estimation and correction capabilities that occur during the acquisition process, the frequency error tracking and drift correction techniques allow the demodulator to track and correct frequency drift as the frequency error continuously changes. The disclosed demodulation techniques are particularly important during the transmission of extended packets where such frequency drifts can accumulate over time and cause packet detection to fail during the demodulation process, resulting in symbol errors and decreased demodulation efficiency.

Figure 1:
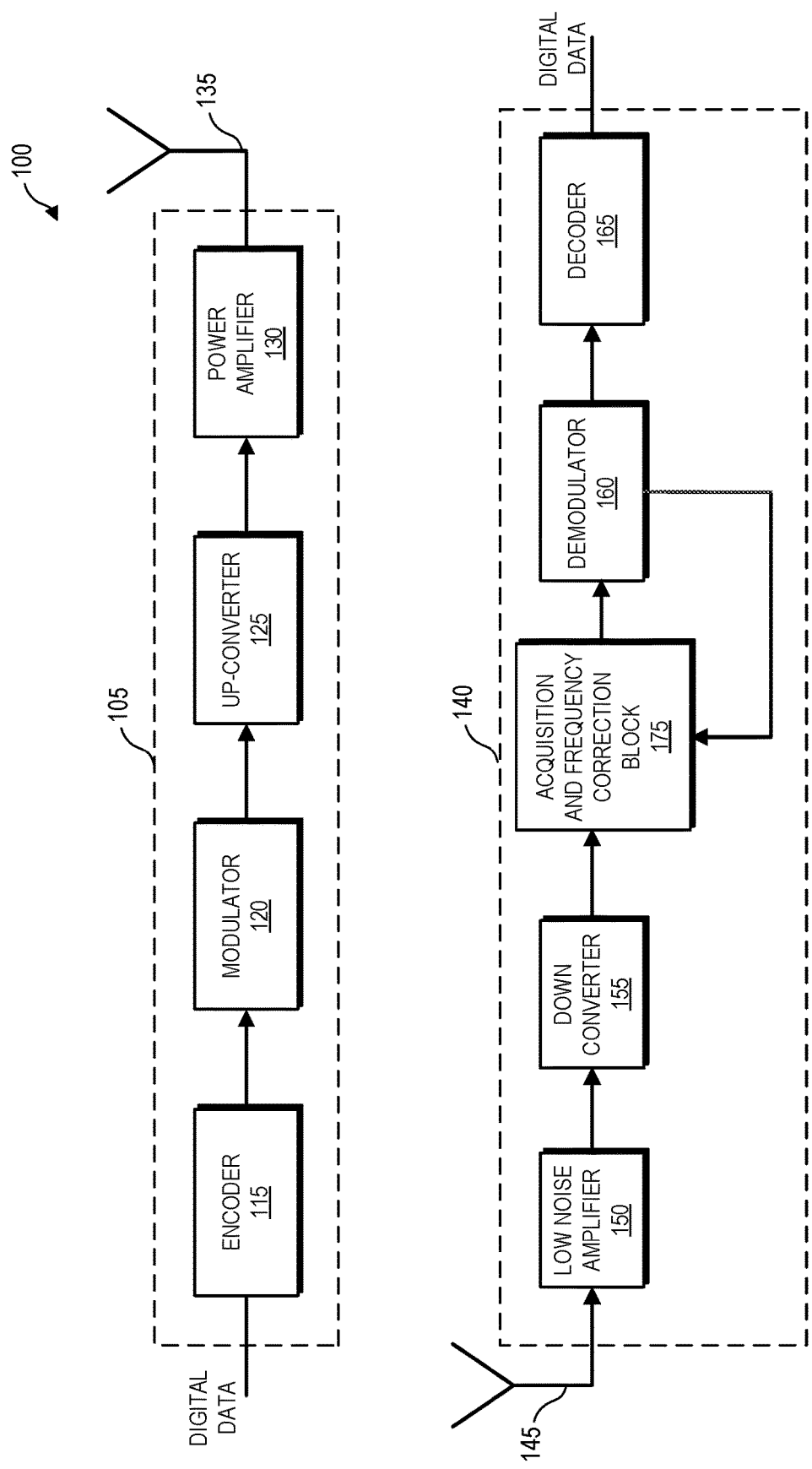
FIG. 1 illustrates a block diagram of an example transmitter and receiver system utilized for data transmission, in accordance with some embodiments.

FIG. 1 illustrates a block diagram of an example transmitter and receiver system 100 in accordance with some embodiments. A frequency shift keying (FSK) demodulator discussed herein may be included in a receiver system or combination transmitter and receiver system (or transceiver system) used for communicating data. Elements typically used for communicating digital data between two devices are illustrated in FIG. 1, which shows an example transmitter system 105 and an example receiver system 140 (where both systems 105 and 140 are included in a transceiver system). Transmitter system 105 includes an encoder 115, a modulator 120, an up-converter 125, a power amplifier 130, and an antenna 135. Receiver system 140 includes an antenna 145, a low noise amplifier (LNA) 150, a down converter 155, an acquisition and frequency correction block 175, a demodulator 160 (discussed below in connection with FIG. 2, FIG. 3, and FIG. 4), and a decoder 165. In addition, a local oscillator (LO) may be included in down converter 155 to down convert the received signal to a lower frequency, as is well known in the art. Additional elements, such as, for example, a gain control block (both analog and digital), an impairment correction block, or a timing tracking block, or combinations thereof, may also be included in transmitter 105 and receiver 140.

During operation of transmitter 105, digital data to be transmitted to receiver 140 of a receiving device is provided to encoder 115. Encoder 115 is configured to encode the digital data into a form suitable for modulation by modulator 120. For example, encoder 115 may implement a voice or image codec that translates the digital data into a binary data stream. In some embodiments, encoder 115 is also configured to implement an error correction scheme to transform the binary data stream (digital data) into a form suitable for detecting channel errors that may occur during data transmission, such as by adding redundancy bits to the binary data stream.

The output of encoder 115 is provided to modulator 120, which is configured to implement a frequency shift keying (FSK) modulation scheme (such as 2-FSK or 4-FSK, offset quadrature phase-shift keying (OQPSK), or the like) for converting the binary data stream into an analog signal form suitable for transmission to receiver 140, such as on a wireless medium. In some embodiments, the modulator 120 (and demodulator 160) implements a non-coherent FSK modulation scheme.

Modulator 120 is configured to translate bits of the binary data stream into a stream of data symbols, where a data symbol S is an analog pulse waveform having a frequency (e.g., in baseband) and persisting for a duration of time, also referred to as symbol duration time period T. It is noted that the phrase "symbol duration period T" used herein generally indicates the amount of time represented by the symbol duration time period T, while the phrase "symbol time period T" used herein generally indicates a particular instance of the symbol duration time period T. The modulation scheme implemented at the encoder 115 defines a set of symbols and a set of frequencies, where each symbol represents one or more bits and each symbol itself is represented by a corresponding frequency, also referred to herein as a symbol frequency. In some embodiments, modulator 120 may include a voltage-controlled oscillator (VCO) that is typically part of a phase locked loop (PLL) that is able to generate a programmable carrier frequency. The VCO may be controlled to generate an analog pulse (persisting for symbol duration period T) at the various symbol frequencies in order to produce an analog signal encoded with data symbols at a known data symbol rate, where the data symbols correspond to the binary data stream. In various embodiments, the use of symbols results in over the air encoded symbols, where there is a mapping to the data stream that may depend on whether the modulation is, for example, a two level or four level modulation scheme with encoding.

The output of modulator 120 is provided to up-converter 125, which is configured to translate the analog signal (e.g., in baseband) to the radio frequency in which bandwidth has been allocated for the transmission. The output of up-converter 125 is provided to power amplifier 130, which amplifies the power of the analog signal to a sufficient amount to transmit the analog signal to receiver 140 via antenna 135.

At the receiver 140, a radio frequency (RF) analog signal is received at antenna 145 and is provided to LNA 150, which is configured to amplify the RF signal. The amplification step may be useful as the RF signal is likely to have been attenuated through the transmission of the signal from one device to another. The RF signal is therefore enhanced in LNA 150 such that it is at a level suitable for further handling by the remaining elements of receiver 140. The output of LNA 150 is provided to down converter 155, which is configured to convert the analog signal from its allocated transmission frequency to a lower predetermined frequency. The output of down converter 155, after other processing such as down sampling, impairment and gain correction, is provided to acquisition and frequency correction block 175. The acquisition block portion of the acquisition and frequency correction block 175 detects the presence of an incoming over the air packet, estimates when the demodulator 160 is to initiate demodulation, and provides estimates of symbol timing and of an initial frequency correction. The initial frequency correction (as estimated by the acquisition and frequency correction block 175) is generally insufficient for tracking frequency drifts that occur during packet reception, particularly for long packets. As a result, in various embodiments, the output of acquisition and frequency correction block 175 is provided to demodulator 160, which is used in combination with acquisition and frequency correction block 175 to correct frequency drift that occurs after the initial frequency correction. That is, in addition to demodulator 160 being configured to implement an FSK demodulation scheme that is counterpart to the FSK modulation scheme implemented in modulator 120, demodulator 160 provides frequency error feedback to acquisition and frequency correction block 175 that allows for the correction of accumulated frequency drift.

Demodulator 160 is configured to receive the output of acquisition and frequency correction block 175 as an input data signal, which contains an FSK-modulated data signal encoded with one or more data symbols. The input data signal has a known data symbol rate at which the data symbols have been encoded into the input signal, where each data symbol represents one or more bits. For example, the input data signal may have a data symbol rate equivalent to a 1 megabits per second (mbps) data rate. The data symbol rate may translate to a different data bit rate (e.g., less than the data symbol rate), depending on the modulation scheme utilized to modulate the signal, and the error correction scheme utilized.

Demodulator 160 includes a number of correlators (depicted in greater detail in the description of FIG. 3) that are used for symbol demodulation and to generate the phase error and corresponding frequency error that is used as feedback to correct frequency drift. Each correlator is configured to identify and recover a received analog signal (such as a signal encoded with data symbols) in the presence of noise. Each correlator receives the input data signal and processes the signal at a particular rate, referred to as the oversampling rate. As used herein, the oversampling rate is the ratio of the sample rate at the receiver demodulator over the symbol rate, where the symbol rate is the rate at which the original symbols were generated. In some embodiments, the oversampling ratio is 8 samples per symbol, while the oversampling ratio is 4 samples per symbol in other embodiments. In various embodiments, other oversampling ratios may be used further upstream in the receiver chain to describe the signal, for example, at the level of the channel filter it is customary to have oversampling ratios of 2, 4, or 8.

In order to correct frequency drift and accurately recover data symbols from the analog signal, demodulator 160 is configured to generate a frequency error tracking signal for use in preventing or correcting frequency errors associated with recovering the data symbols. To perform frequency error tracking, demodulator 160 may include, for example, a symbol recovery circuit and a frequency error detection circuit (discussed further with reference to FIGS. 2 and 3). The symbol recovery circuit is configured to recover the data symbol and the frequency error detection circuit is configured to generate the frequency deviation or frequency error associated with each recovered data symbol. The frequency error signal of demodulator 160 is fed back into the acquisition and frequency correction block 175 of the receiver system 140 to adjust the frequency in order to minimize the frequency deviation or frequency drift detected by demodulator 160. The recovered symbol or data is provided as demodulated output to decoder 160.

Decoder 165 receives the output of demodulator 160 and is configured to detect and correct errors of the binary data stream according to the error correction scheme also utilized by encoder 115. Decoder 165 may also be configured to remove redundancy bits from the binary data stream. Decoder 165 is also configured to decode the binary data stream into digital data, as counterpart to the format utilized by encoder 115. The output of decoder 165 is then used for further digital signal processing as is generally known in the art.

Figure 2:
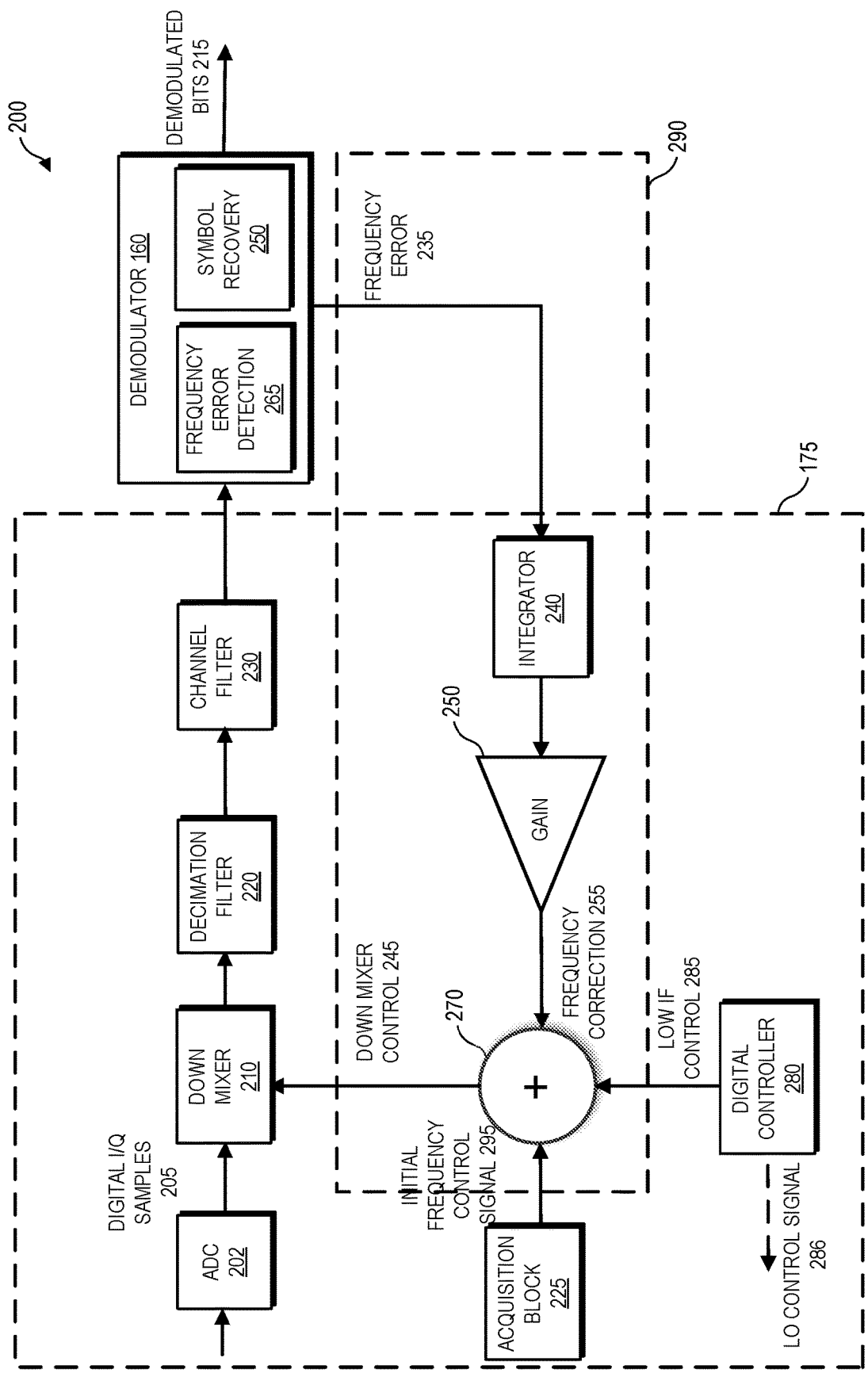
FIG. 2 illustrates a block diagram depicting an example frequency drift correction system, in accordance with some embodiments.

FIG. 2 illustrates, in block diagram form, acquisition and frequency correction block 175 and demodulator 160 of FIG. 1 in accordance with some embodiments. In various embodiments, acquisition and frequency correction block 175 and demodulator 160 of FIG. 1 combine to form a frequency drift correction system 200 utilized in the transmitter and receiver system 100 of FIG. 1. A frequency feedback loop 290 is introduced that may be implemented to use a frequency error tracking signal 235 obtained utilizing demodulator 160 to generate a frequency correction signal 255 for improved received signal demodulation. Frequency drift correction system 200 includes an acquisition and frequency correction block 175 coupled to a demodulator 160. Acquisition and frequency correction block 175 includes an analog-to-digital converter (ADC) 202, a down mixer 210, a decimation filter 220, a channel filter 230, an integrator 240, a gain block 250, a digital controller 280, an acquisition block 225, and an adder 270. Demodulator 160 includes a frequency error detection circuit 265 and a symbol recovery circuit 250. In various embodiments, down mixer 210 may be an IF down mixer that is used for low IF receivers.

During operation, down mixer 210 receives digital I/Q samples 205 from an ADC 202 that has converted the analog signals received from down converter 155 to digital I/Q samples 205. Down mixer 210 mixes the received digital I/Q samples 205 with down mixer control signal 245 provided from frequency feedback loop 290 to generate a frequency drift corrected signal (i.e., a down converted IF signal) that is provided to decimation filter 220. That is, in various embodiments, such as the case for low IF receiver architectures, down mixer 210 uses the digital I/Q samples 205 and down control mixer signal 245 provided from adder 270 to generate a down converted IF signal that has been corrected for frequency drift using the frequency error tracked by frequency error detection circuit 265 and provided to frequency feedback loop 290. In various embodiments, decimation and correction algorithms, such as for automatic gain control (AGC) gain, I/Q imbalance correction, DC offset correction and other correction filters, may be used as decimation and correction filters between the ADC and the down mixer 210 or between the down mixer 210 and the demodulator 160. Decimation filter 220 receives the signal and in order to reduce the data rate, lowers the sampling rate from a first sampling rate to a second sampling rate, as is generally known in the art. Decimation filter 220 provides the decimated down converted IF signal to channel filter 230. In various embodiments, decimation filter 220 may not be required for designs with minimal frequency offsets. Channel filter 230 receives the output of decimation filter 220 and utilizes noise filters to reduce the amount of noise in the decimated baseband signal. The output of channel filter 230 is then provided to demodulator 160.

Demodulator 160 receives the input baseband signal from channel filter 230. As stated previously, the input baseband signal contains an FSK-modulated data signal encoded with one or more data symbols. Demodulator 160 uses the symbol recovery circuit 250 to generate demodulated bits 215 and the frequency error detection circuit 265 to generate a frequency error tracking signal 235. That is, upon receiving input data, symbol recovery circuit 250, demodulates the signal to produce demodulated bits 215 while at the same time frequency error detection circuit 265 computes a frequency error tracking signal 235 in FIG. 2. Both the symbol recovery circuit 250 and the frequency error detection circuit 265 use correlation circuits (described in detail with respect to FIG. 3 below) to generate the demodulated bits 215 and a corresponding frequency error tracking signal 235, respectively. Frequency error detection circuit 265 provides the associated frequency error to integrator 240 of frequency feedback loop 290 for use in frequency drift correction.

Integrator 240 integrates the frequency error and generates frequency correction signal 255 via gain block 250, which is provided to adder 270. In various embodiments, adder 270 adds frequency correction signal 255 to initial frequency control signal 295 provided from acquisition block 225 to generate down mixer control signal 245, which is used by down mixer 210 for frequency drift correction. That is, adder 270 receives as input the frequency correction signal 255 that has been determined using the frequency error detection circuit 265 and the symbol recovery circuit 250 and adds the frequency correction signal 255 to the output of the acquisition block 225 (initial frequency control signal 295). Acquisition block 225 is used during the signal acquisition process to estimate and correct the initial frequency error. In various embodiments, adder 270 adds frequency correction signal 255 and initial control frequency control signal 295 to low IF control signal 285 from digital controller 280 to generate down mixer control signal 245. That is, adder 270 takes the frequency correction signal 255, the initial control frequency control signal 295 and adds both signals to the output of the digital controller 280 (low IF control signal 285) operating a desired IF frequency. In various embodiments, by adding frequency correction signal 255 to low IF control signal 285, adder 270 is adjusting low IF control signal 285 generated at digital controller 280 based on the frequency error to correct the frequency drift. In various embodiments, as digital controller 280 is coupled to the aforementioned adder 270 and optionally to a local oscillator of down converter 155, the function of digital controller 280 is to govern the exchange of low IF control signal 285 and LO control signal 286 between the adder 270 and the local oscillator. Thus, in various embodiments, the digital controller 280 therefore serves as an interface between the digital portion of receiver 140 in FIG. 1 (which includes the acquisition and frequency correction block 175, demodulator 160, and decoder 165) and the analog portion of the receiver 280 (which includes LNA 150 and down converter 155). The digital controller will preferably include a number of registers, discrete logic, state machines, etc., although other forms of digital circuitry may be suitable as will be appreciated by those of skill in the art. The output of adder 270, which is down mixer control signal 245, is then provided to down mixer 210 for multiplication with digital I/Q samples 205 to correct the associated frequency drift.

In various embodiments, the addition of the two signals (initial frequency correction signal 295 and frequency correction signal 255) or the three signals (low IF control signal 285, initial frequency correction signal 295, and frequency correction signal 255) at adder 270 generates a new signal, i.e., the down mixer control signal 245. In various embodiments, the down mixer control signal 245 is used to correct the frequency drift that has occurred after the initial error estimation and correction of the frequency error by acquisition block 225.

In various embodiments, the frequency drift or frequency error associated with the low IF control signal may be corrected using a separate digital down mixer located proximate to the antenna. In various embodiments, the frequency drift or frequency error associated with the local oscillator (LO) frequency for an LO located in, for example, down converter 155 of FIG. 1, may be corrected using an analog down mixer also located in, for example, down converter 155, where the analog down mixer utilizes the initial frequency correction signal 295 and the frequency correction signal 255 to adjust the LO frequency. In various embodiments, the down mixer control signal 245 is offset from the frequency of the low IF control signal 285 by the frequency correction signal 255 including the initial frequency correction signal 295 such that when combined with the digital IQ samples 205 at down mixer 210, generates the IQ samples at a new and more precise frequency (with respect to, for example, the frequency of the low IF control signal 285). Thus, frequency correction signal 255 is used to correct for the frequency error found in the FSK receiver using the output of demodulator 160 (both the recovered demodulated bit 215 and the associated frequency error 235) in frequency drift correction system 200. As a result, demodulator 160 has used the frequency error to correct a frequency drift associated with the input digital IQ samples or the low IF control signal 285. The correction executed by demodulator 160 allows for frequency tracking where the original frequency estimate is done through the frequency acquisition and frequency correction block 175 depicted in FIG. 1.

Referring to FIG. 1 and FIG. 2, in alternate embodiments, for low IF receivers, multiple IF down mixers (e.g., a plurality of digital IF down mixers) may be used. In alternate embodiments, down mixer 210 may be a mixer that is used with, for example, direct-conversion receivers or zero-IF receivers or other heterodyne receiver architectures. In various embodiments, digital controller 280 may control the LO signal output by the local oscillator that is provided to a down mixer located in down converter 155 that may be utilized for both analog down conversion and frequency drift correction. In various embodiments, the LO signal and LO control signal 286 are two distinct signals, where the LO signal is the output of the local oscillator and the LO control signal 286 optionally controls the local oscillator. Thus, the local oscillator signal may be controlled but not driven by the digital controller 280. In various embodiments, digital controller 280 may control a low IF control signal 285 provided to adder 270 for frequency drift correction. In various embodiments, the digital controller 280 produces a control signal that is received by a frequency synthesis block, which in turn generates the LO signal. In some embodiments, the frequency synthesis block may be an analog phase locked loop or a digital phase locked loop. In an alternate embodiment, such as is the case in direct-conversion receiver, the frequency of the signal provided to down mixer 210 from, for example, digital controller 280 may be equal to or approximately equal to the frequency of the received signal provided to down mixer 210.

In various embodiments, in receiver architectures utilizing an analog phased-locked loop (PLL), the frequency correction signal 255 may be applied directly or indirectly to the analog PLL control itself. That is, instead of the frequency correction signal 255 being used to generate the down mixer control signal 245 that controls IF down mixer 210, the frequency correction signal 255 is used in combination with the LO control signal the digital controller creates (LO control signal 286) to control the frequency synthesis that in turn generates the LO signal going to the analog down converter 155. Thus, instead of using down mixer 210 and down mixer control signal 245 to eliminate the frequency drift, frequency correction signal 255 may be added to LO control signal 286, internal or external to digital controller 280, to eliminate the frequency drift associated with transmitter and receiver system 100.

Figure 3:
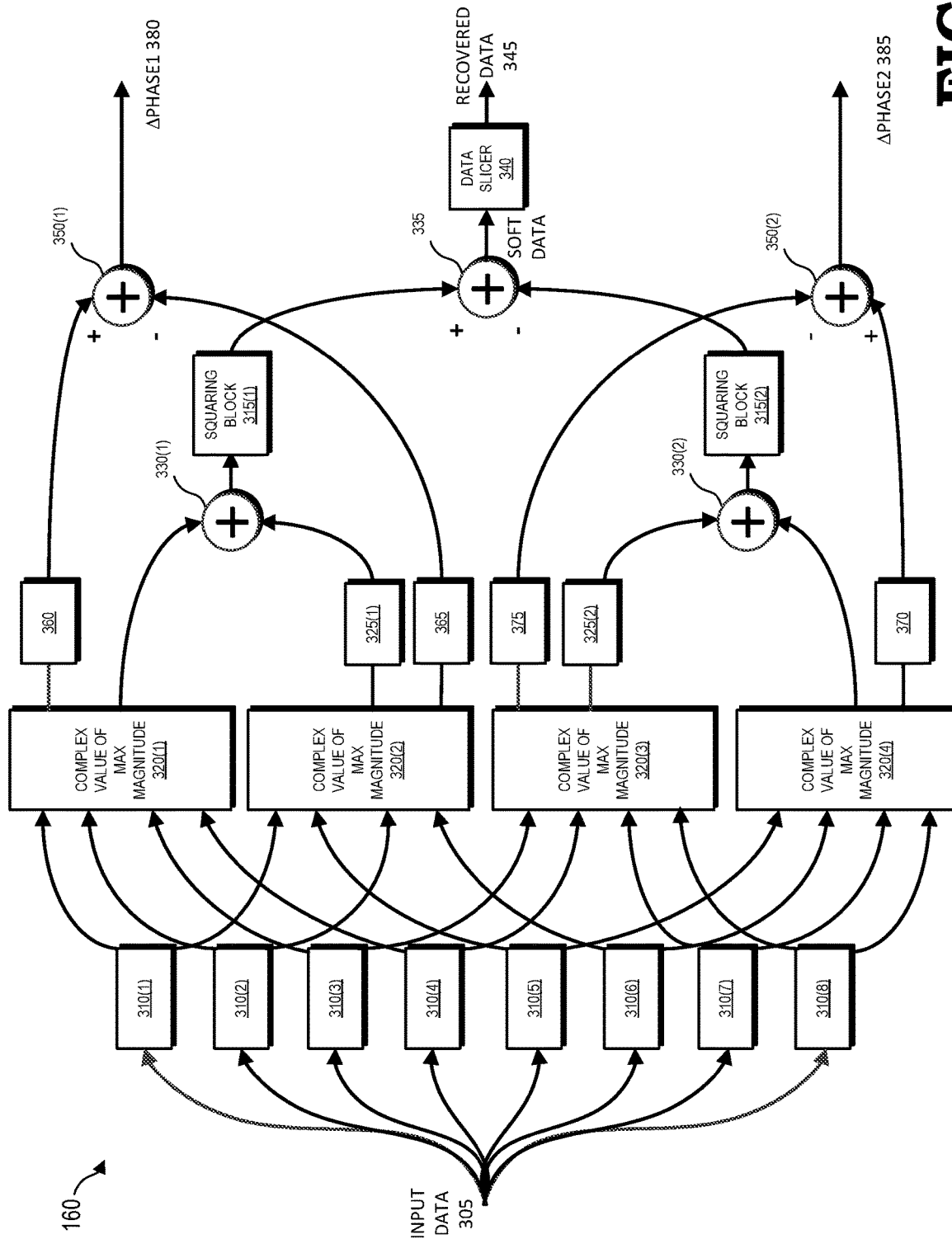
FIG. 3 illustrates a block diagram depicting an example demodulator, in accordance with some embodiments.

FIG. 3 illustrates an embodiment of a demodulator 160 that implements frequency error tracking in a 2-FSK system depicted in FIGS. 1 and 2. The demodulator 160 makes a demodulation decision for a current symbol based on a fixed number of sets of symbols and generates an associated phase error difference that is used for frequency error tracking. The phase error difference and corresponding frequency error ascertained by demodulator 160, unlike, for example, the case in an uncorrected design that does not utilize demodulator 160, may be used by transmitter and receiver system 100 to correct frequency drift that has accumulated the receiver or the transmitter, or combination thereof, where the phase error difference may increase or decrease, or combination thereof, in magnitude over time, such as for a random walk.

In the embodiment shown, the demodulator 160 makes a demodulation decision for a current symbol based on two triplets of symbols and generates an associated phase difference (phase difference 380 or phase difference 385) that is used for frequency error tracking. In various embodiments, other FSK implementations of the demodulator may be used for varying numbers of symbols, such as, for example O-QPSK, 4-FSK, 8-FSK, and 16-FSK, etc. Demodulator 160 includes correlation circuits 310(1)-(8), MAX blocks 320(1)-(4), delay blocks 325(1)-(2), adder blocks 330(1)-(2), adder block 335, adder blocks 350(1)-(2), phase component block 360, phase component block 365, phase component block 370, phase component block 375, data slicer 340, and squaring blocks 315(1)-(2). Phase component blocks 360-375 and adder blocks 350(1) form a frequency error detection circuit. Correlation circuits 310 (1)-(8), MAX blocks 320(1)-(4), delay blocks 325(1)-(2), adder blocks 330(1)-(2), adder block 335, adder blocks 350(1)-(2), data slicer 340, and squaring blocks 315(1)-(2) form a symbol recovery circuit. It is noted that in some embodiments, each correlation circuit 310 includes a corrector and a squaring block configured to square a magnitude component of correlator output.

In various embodiments, demodulator 160 includes eight correlation circuits 310, each configured to detect a respective one of a number of filter kernel vectors encoding one of the following triplets of reference symbols: 000, 001, 010, 011, 100, 101, 110, 111, which can be viewed in the receipt order of [Sn2][Sn1][Sc], or [Sc][Sp1][Sp2]. That is, demodulator 160 uses the eight correlation circuits and makes a demodulation decision for a current symbol based on two triplets of symbols that include the current symbols Sc: (1) a triplet of symbols that includes the current symbol Sc and two past symbols Sp1 and Sp2 (e.g., the past symbol Sp1 is the symbol immediately preceding the current symbol Sc, and the past symbol Sp2 is the symbol immediately preceding the past symbol Sp1), and (2) another triplet of symbols that includes the current symbol Sc and two next symbols Sn1 and Sn2 (e.g., the next symbols Sn1 is the symbol immediately following the current symbol Sc, and the next symbol Sn2 is the symbol immediately following the next symbol Sn1). In alternate embodiments, the number of correlation circuits 310 may vary depending on, for example, whether 4-FSK, 8-FSK, or 16-FSK is used or whether doublets or quartets are used. The correlators of correlation circuits 310 each receive complex parts of input data signal 305 that include real and imaginary parts (such as input/output (I/O) signals) and are configured to output a correlation signal. The correlation signal has a complex correlation value that includes real and imaginary parts. The complex correlation values may each be viewed as a "correlation vector."

The complex correlation values are provided to MAX blocks 320(1)-(4). Each complex correlation value has a magnitude component and a phase component. The magnitude component of the complex correlation value indicates a likelihood of the current symbol value having a particular symbol value.

Each MAX block 320 receives the complex correlation outputs, the number of which may vary depending on the type of FSK modulation scheme utilized. Each MAX block 320 is configured to select the largest magnitude component from among the complex correlation input values and output the complex correlation value associated with the largest magnitude component.

MAX 320(1) is configured to output a first future correlation value and the associated phase component to phase component block 360, the first future correlation value having a largest magnitude component, which indicates a likelihood of the current symbol having a symbol value of 0 based on the portion of the input signal that includes symbols Sn2, Sn1, and Sc.

MAX 320(4) is configured to output a second future correlation value and the associated phase component to phase component block 370, the second future correlation value having a largest squared component, which indicates a likelihood of the current symbol having a symbol value of 1 based on the portion of the input signal that includes symbols Sn2, Sn1, and Sc.

MAX 320(2) is configured to output a first previous correlation value and the associated phase component to phase component block 365, the first previous correlation value having a largest magnitude component that indicates a likelihood of the current symbol having a symbol value of 0 based on the portion of the input signal that includes symbols Sc, Sp1, and Sp2.

MAX 320(3) is configured to output a second previous correlation value and the associated phase component to phase component block 375, the second previous correlation value having a largest magnitude component that indicates a likelihood of the current symbol having a symbol value of 1 based on the portion of the input signal that includes symbols Sc, Sp1, and Sp2. The portion of the input signal that includes symbols Sc, Sp1, and Sp2 may be referred to as a first triplet, and the portion of the input signal that includes symbols Sn2, Sn1, and Sc may be referred to as a second triplet.

The correlation value outputs of MAX block 320(2) and MAX block 320(3) are each provided to a respective delay block 325(1) and delay block 325(2). Delay block 325(1) and delay block 325(2) are configured to delay the respective outputted correlation values for two symbol time periods in order to align the comparison of the correlation values based on the first triplet with the correlation values based on the second triplet, overlapping at the current symbol. In various embodiments, the number of delay blocks and the amount of delay provided by, for example, delay block 325(1) and delay block 325(2), may be adjusted depending on the number of triplets utilized in the FSK modulation scheme.

The first future correlation value and the first previous correlation value output by MAX block 320(1) and delay block 325(1) are combined at adder block 330(1). Similarly, the second future correlation value and the second previous correlation value output by MAX block 320(4) and delay block 325(2) are combined at adder block 330(2). In addition to providing the phase component of the correlation signal to phase component block 360 and phase component block 370 for use in frequency error tracking, the phase component of each complex correlation value is provided to adder blocks 330(1) and (2). Adder block 330(1) and adder block 330(2) are configured to use the phase component to effectively align each magnitude component of the complex correlation values, using the current symbol as a reference.

The complex correlation values can be viewed as vectors, where the complex correlation values can be tentatively rotated or otherwise aligned as a vector using the phase component of each complex correlation value. Since there is no constraint that the future and previous complex correlation values would have the same phase, the phase component of each complex correlation value is used as a rotation angle to align the respective complex correlation value with the angle of the current symbol. The resulting likelihood of the symbol value depends on the magnitude components of the rotated complex correlation values.

For example, the first future complex correlation value based on Sn2, Sn1, and Sc is aligned with the angle of Sc, and the first previous complex correlation value based on Sc, Sp1, and Sp2 is aligned with the angle of Sc. When the first future and first previous complex correlation values indicate that a same symbol value for the current symbol was detected, then the alignment of first future and first previous complex correlation values with the angle of the current symbol will likely result in substantial alignment of the magnitude of the first future and first previous complex correlation values in a same direction, despite noise and other impairments.

When the first future and first previous complex correlation values indicate different symbol values were detected, then the alignment of the first future and first previous complex correlation values with the angle of the current symbol will likely result in misalignment of the magnitude of the first future and first previous complex correlation values in different directions. Complex correlation values having the same magnitude may even cancel each other out when rotated by the phase component in different directions. It is noted that for a useful received signal, it is highly unlikely that noise and other impairments would be large enough to cause the future and previous correlation values that indicate different symbol values to appear aligned.

Once aligned, adder block 330(1) sums the real parts of the first future and first previous complex correlation values and separately sums the imaginary parts of the complex correlation values, and outputs the real sum and the imaginary sum to squaring block 315(1). Similarly, adder block 330(2) sums the real parts of the second future and second previous complex correlation values once they are tentatively aligned and separately sums the imaginary parts of the complex correlation values, outputting the real sum and imaginary sum to squaring block 315(2).

Squaring blocks 315(1) and (2) are configured to compute a signal power having some magnitude based on the real and imaginary sums respectively provided by adder blocks 330 (1) and (2), such as by squaring the real sum, squaring the imaginary sum, and adding the resulting squares. Accordingly, a magnitude of the output of squaring block 315(1) indicates a likelihood of the current symbol having a '0' symbol value, and the output of squaring block 315(2) indicates a likelihood of the current symbol having a '1' symbol value.

The outputs of squaring blocks 315(1) and 315(2) are summed at adder block 335, which outputs the difference as soft data, which indicates the most likely symbol value for the current symbol Sc. The difference between phase component of phase component block 360 and phase component of phase component block 365 is calculated at adder block 350(1) as phase difference 1. At adder block 350(2), the difference between phase component of phase component block 370 and phase component of phase component block 365 is calculated and output as phase difference 2. In one embodiment, a positive output value (or soft data value) at adder block 335 indicates a symbol value of 0 and a negative output value at adder block 335 indicates a symbol value of 1, although other mappings may be used in other embodiments, depending on how the combined correlation results are added. Based on whether the soft data is indicative of a symbol value of 0 or a symbol value of 1, the corresponding phase difference (phase difference 380 or phase difference 385) is selected and provided as the frequency error that is used to generate the frequency correction signal to correct the frequency drift associated with, for example, the digital IQ samples. The data slicer 340 detects the positive or negative value of soft data and outputs recovered data 345 accordingly.

Figure 4:
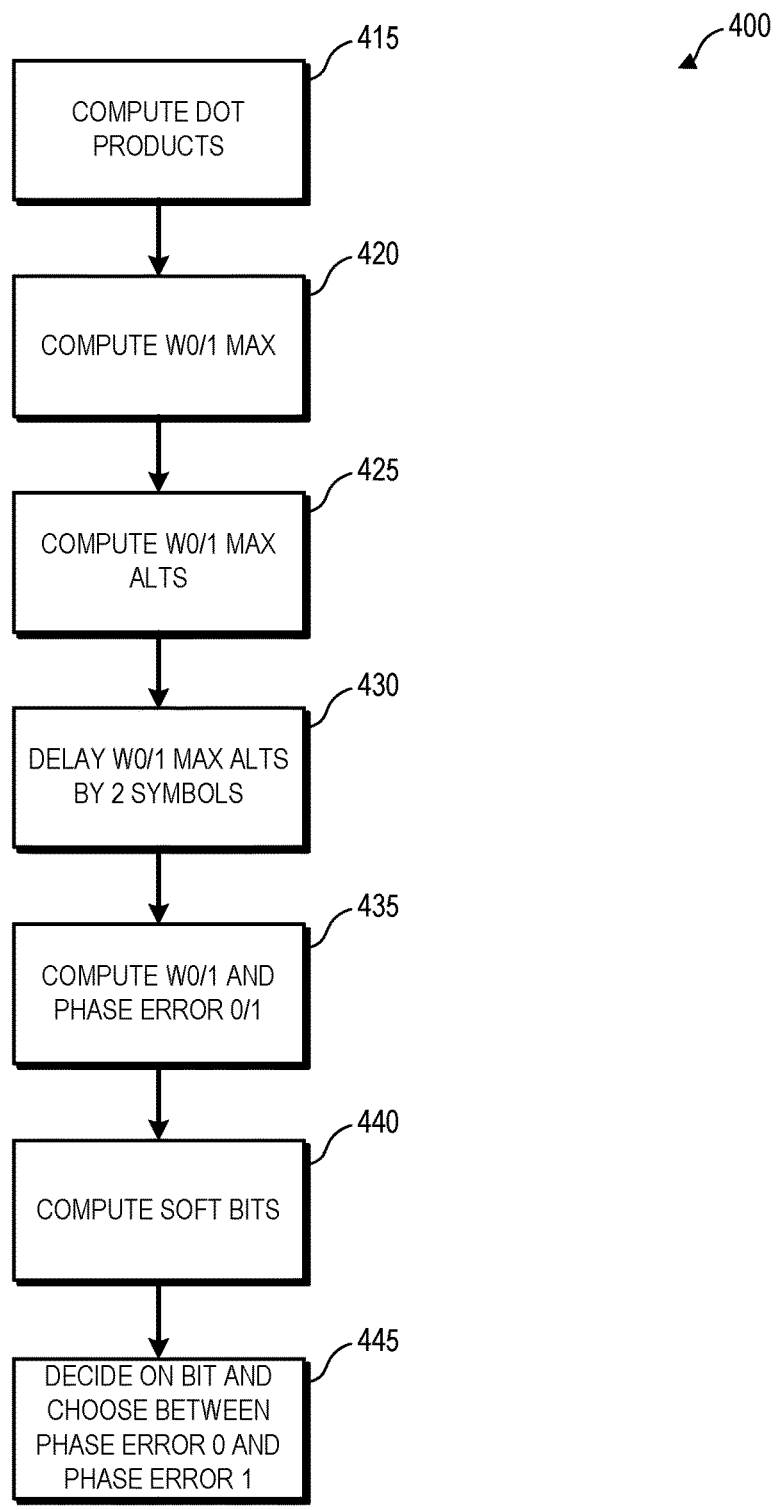
FIG. 4 illustrates a flow diagram depicting an example of a method of correcting frequency drift using frequency error tracking in accordance with some embodiments.

FIG. 4 illustrates a flow diagram depicting a method 400 of correcting frequency drift using frequency error tracking in accordance with some embodiments. The method 400 is implemented in some embodiments of receiver system 140, frequency drift correction system 200 and demodulator 160 shown in FIGS. 1, 2 and 3.

In various embodiments, the method flow begins with block 415. At block 415, FSK demodulator 160 of FIG. 1, FIG. 2, and FIG. 3 uses correlation circuits 310(1)-(8) to compute the dot products of the input data 305 to generate complex correlation values, in addition to having a squaring block configured to square a magnitude component of correlator output.

At block 420, using the FSK demodulator 160 of FIG. 1, FIG. 2, and FIG. 3, MAX block 320(1) and MAX block 320(4) compute the largest magnitude (W0 max and W1 max) to be provided to adder block 330(1) and 330(2), respectively. Similarly, at block 425, MAX block 320(2) and MAX block 320(3) compute the largest magnitude (W0 max alt and W1 max alt) to be provided (with a delay) to adder block 330(1) and 330(2), respectively.

At block 430, using the FSK demodulator 160 of FIG. 1, FIG. 2, and FIG. 3, the correlation values W0 max alt and W1 max alt are delayed at delay blocks 325(1)-(2) by a predetermined number of symbol time periods, in this case two symbols, in order to align the comparison of the correlation values based on the first triplet with the correlation values based on the second triplet, overlapping at the current symbol.

At block 435, using the FSK demodulator 160 of FIG. 1, FIG. 2, and FIG. 3, W0 is computed using adder block 330(1), with the corresponding frequency error 0 being computed using adder block 350(1). Similarly, W1 is computed using adder block 330(2), with the corresponding frequency error 1 being computed using adder block 350(2).

At block 440, using the FSK demodulator 160 of FIG. 1, FIG. 2, and FIG. 3, the soft bits are computed by adder block 335 using the likelihood of the current symbol having a first bit value (e.g., 0) and the likelihood of the current symbol having a second bit value (e.g., 1) computed at squaring blocks 315(1) and 315(2), respectively.

At block 445, using the FSK demodulator 160 of FIG. 1, FIG. 2, and FIG. 3, a decision is made by data slicer 340 as to which bit to select as the output of the demodulator 160, in addition to providing the corresponding frequency error for frequency error tracking. In one embodiment, a bit (either 0 or 1) is selected, and the corresponding frequency error (frequency error 0 or frequency error 1) is chosen and provided to frequency feedback loop 290 of FIG. 2 for frequency error tracking.

Figure 5:
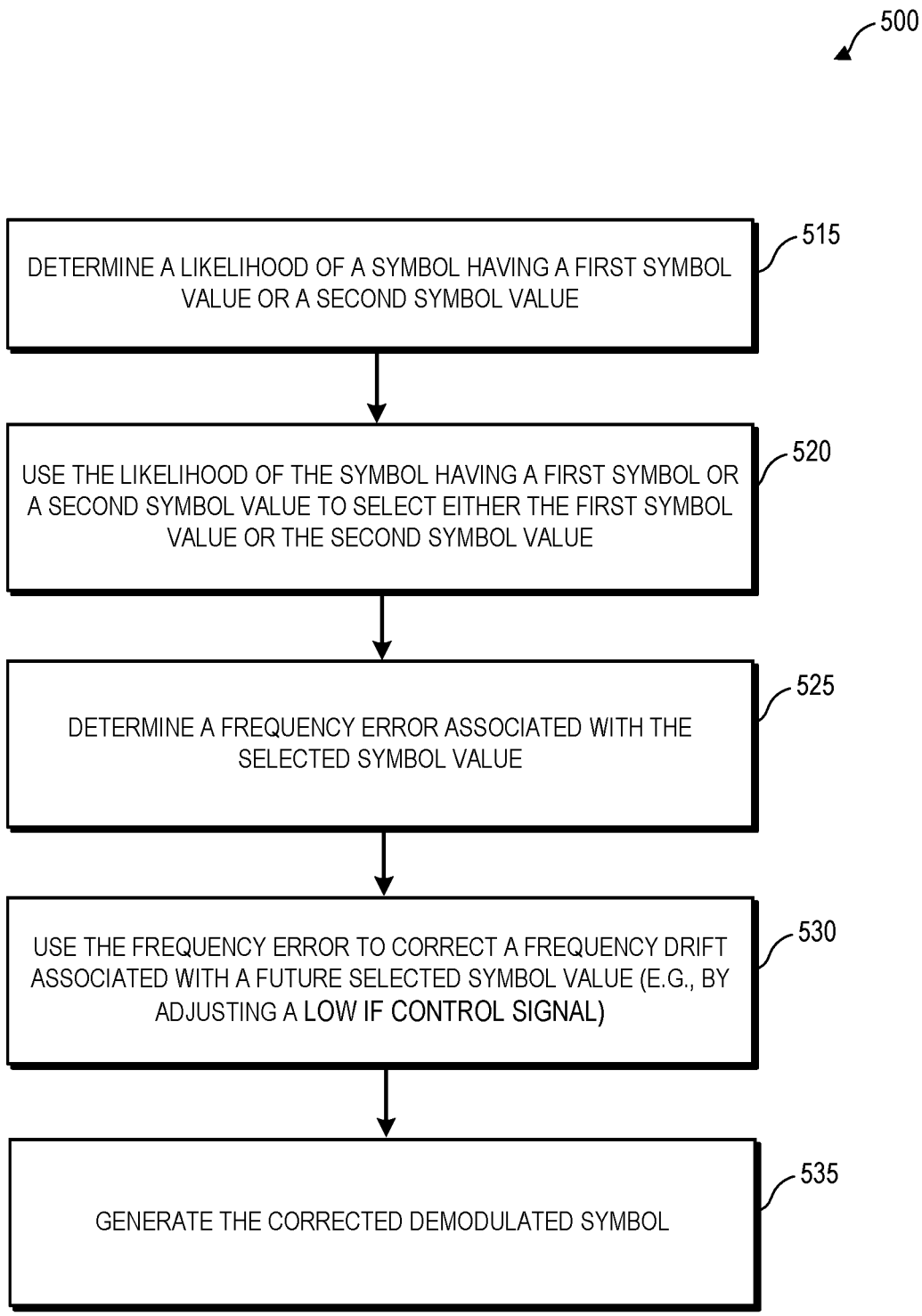
FIG. 5 illustrates a flow diagram depicting an example of a method of correcting frequency drift using frequency error tracking in accordance with some embodiments.

FIG. 5 illustrates, in flow diagram form, a method 500 of correcting frequency drift using, for example, the method 400 described in FIG. 4 and the acquisition and frequency correction block 175 and a demodulator 160 depicted in FIG. 1, FIG. 2, and FIG. 3. in accordance with some embodiments. In various embodiments, method 500 uses frequency error tracking to correct for frequency drift example of transmitter and receiver system 100. The method 500 is implemented in some methods and embodiments utilizing receiver system 140, frequency drift correction system 200 and demodulator 160 shown in FIGS. 1, 2, 3 and 4

At block 515, with reference to FIGS. 1-4, a likelihood of a symbol having a first symbol value or a second symbol value is determined using FSK demodulator 160. That is, referring to squaring blocks 315 of FIG. 3 and block 440 of FIG. 4, a magnitude of the output of squaring block 315(1) is computed that indicates a likelihood of the current symbol having a '0' symbol value and a magnitude of the output of squaring block 315(2) is computed that indicates a likelihood of the current symbol having a '1' symbol value.

At block 520, FSK demodulator 160 uses the likelihood of the symbol having a first symbol value or a second symbol value to select either the first symbol value or the second symbol value for the symbol, the first symbol value or the second symbol value that is selected being a selected symbol value. That is, referring to block 440 of FIG. 4 and adder block 335 of FIG. 3, the soft bits are computed by adder block 335 using the likelihood of the current symbol having a first bit value (e.g., 0) and the likelihood of the current symbol having a second bit value (e.g., 1).

At block 525, FSK demodulator 160 determines a frequency error associated with the selected symbol value. That is, referring to block 445 of FIG. 4 and data slicer 340 of FIG. 3, after the decision is made by data slicer 340 as to which bit to select as the output of the demodulator 160, the corresponding frequency error is provided for frequency error tracking. At block 530, acquisition and frequency correction block 175 uses the frequency error to correct a frequency drift associated with a future selected symbol value. At block 535, the corrected demodulated symbol is generated at the output of FSK demodulator 160.

In various embodiments, a method includes, at a frequency shift keying (FSK) demodulator, determining a likelihood of a symbol having a first symbol value or a second symbol value, using the likelihood of the symbol to select either the first symbol value or the second symbol value for the symbol, the first symbol value or the second symbol value that is selected being a selected symbol value, selecting a frequency error from a first frequency error or a second frequency error, and using a down-mixer and the frequency error to correct a frequency drift associated with a future selected symbol value.

In various embodiments, the method further includes adjusting a low intermediate frequency (IF) control signal generated at a digital controller based on the frequency error to correct the frequency drift.

In various embodiments of the method, using the frequency error to correct the frequency drift includes generating a down mixer control signal to control a frequency of an output signal of a down-mixer.

In various embodiments of the method, generating the down mixer control signal includes adding a frequency correction signal to an initial frequency control signal to adjust the frequency of the output signal of the down-mixer.

In various embodiments, the method further includes providing the frequency error to an integrator to generate the frequency correction signal.

In various embodiments of the method, the frequency error selected from the first frequency error and the second frequency error is selected based on the selected symbol value.

In various embodiments of the method, the first frequency error is generated by calculating a first difference between a first phase component associated with a first future correlation value and a second phase component associated with a first previous correlation value.

In various embodiments of the method, the second frequency error is generated by calculating a second difference between a third phase component associated with a second future correlation value and a fourth phase component associated with a second previous correlation value.

In various embodiments, an apparatus includes a frequency shift keying (FSK) demodulator, a down-mixer coupled to the FSK demodulator, and an adder coupled to the FSK demodulator and the down-mixer. In various embodiments, the FSK demodulator generates a selected symbol value and a frequency error and the down-mixer uses the frequency error to correct a frequency drift associated with a future selected symbol value.

In various embodiments, the apparatus further includes a digital controller coupled to the adder, wherein a frequency of a low intermediate frequency (IF) control signal output by the digital controller is adjusted based on the frequency error.

In various embodiments of the apparatus, the adder uses the frequency error to generate a down mixer control signal to correct the frequency drift.

In various embodiments of the apparatus, the down mixer control signal is generated by adding a frequency correction signal to an initial frequency control signal.

In various embodiments of the apparatus, frequency error is provided to an integrator coupled to the FSK demodulator to generate the frequency correction signal.

In various embodiments of the apparatus, the frequency error is selected from at least a first frequency error and a second frequency error associated with the selected symbol value.

In various embodiments of the apparatus, the first frequency error is generated by calculating a first difference between a first phase component associated with a first future correlation value and a second phase component associated with a first previous correlation value.

In various embodiments of the apparatus, the second frequency error is generated by calculating a second difference between a third phase component associated with a second future correlation value and a fourth phase component associated with a second previous correlation value.

In various embodiments of the apparatus, the FSK demodulator generates the selected symbol value by determining a likelihood of a symbol having a first symbol value or a second symbol value and uses the likelihood of the symbol to select either the first symbol value or the second symbol value for the symbol.

In various embodiments, a method includes generating a set of a plurality of correlation signals, selecting a largest magnitude component from each plurality of correlation signals, using a complex correlation value associated with each selected largest magnitude component to select a symbol value of a symbol, the symbol value that has been selected being a selected symbol value, and using a frequency error to correct a frequency drift.

In various embodiments of the method, the frequency error is selected from at least a first frequency error and a second frequency error associated with the selected symbol value.

In various embodiments of the method, the first frequency error is generated by calculating a first difference between a first phase component associated with a first future correlation value and a second phase component associated with a first previous correlation value, and the second frequency error is generated by calculating a second difference between a third phase component associated with a second future correlation value and a fourth phase component associated with a second previous correlation value.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions or data, or combination thereof, to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below. All patent applications, patents, and printed publications cited herein are incorporated herein by reference in the entireties, except for any definitions, subject matter disclaimers or disavowals, and except to the extent that the incorporated material is inconsistent with the express disclosure herein, in which case the language in this disclosure controls.

What is claimed is:

1. A method, comprising:
   at a frequency shift keying (FSK) demodulator, determining a likelihood of a symbol having a first symbol value or a second symbol value;
   using the likelihood of the symbol to select either the first symbol value or the second symbol value for the symbol, the first symbol value or the second symbol value that is selected being a selected symbol value;
   selecting, at the frequency shift keying (FSK) demodulator, a frequency error from a first frequency error or a second frequency error based on the selected symbol value; and
   using a down-mixer and the frequency error to correct a frequency drift associated with a future selected symbol value;
   wherein the first frequency error is generated by calculating a first difference between a first phase component associated with a first future correlation value and a second phase component associated with a first previous correlation value, and
   wherein the frequency error is provided in feedback from the FSK demodulator to the down-mixer to correct for frequency drift that occurs after initial frequency correction at an acquisition and frequency correction block.

2. The method of claim 1, further comprising:
   adjusting a low intermediate frequency (IF) control signal generated at a digital controller based on the frequency error to correct the frequency drift.

3. The method of claim 1, wherein:
   using the frequency error to correct the frequency drift includes generating a down mixer control signal to control a frequency of an output signal of a down-mixer.

4. The method of claim 3, wherein:
   generating the down mixer control signal includes adding a frequency correction signal to an initial frequency control signal to adjust the frequency of the output signal of the down-mixer.

5. The method of claim 4, further comprising:
   providing the frequency error to an integrator to generate the frequency correction signal.

6. The method of claim 1, wherein:
   the second frequency error is generated by calculating a second difference between a third phase component associated with a second future correlation value and a fourth phase component associated with a second previous correlation value.

7. An apparatus, comprising:
   a frequency shift keying (FSK) demodulator;
   a down-mixer coupled to the FSK demodulator, wherein the down mixer control signal is generated by adding a frequency correction signal to an initial frequency control signal; and
   an adder coupled to the FSK demodulator and the down-mixer, wherein the FSK demodulator generates a selected symbol value and selects a frequency error based on the selected symbol value, the down-mixer using the frequency error to correct a frequency drift associated with a future selected symbol value,
   wherein the adder uses the frequency error to generate a down mixer control signal to correct the frequency drift,
   wherein the frequency error is selected from at least a first frequency error and a second frequency error associated with the selected symbol value and is provided to an integrator coupled to the FSK demodulator to generate the frequency correction signal, and
   wherein the first frequency error is generated by calculating a first difference between a first phase component associated with a first future correlation value and a second phase component associated with a first previous correlation value.

8. The apparatus of claim 7, further comprising:
   a digital controller coupled to the adder, wherein a frequency of a low intermediate frequency (IF) control signal output by the digital controller is adjusted based on the frequency error.

9. The apparatus of claim 7, wherein:
   the second frequency error is generated by calculating a second difference between a third phase component associated with a second future correlation value and a fourth phase component associated with a second previous correlation value.

10. The apparatus of claim 7, wherein:
    the FSK demodulator generates the selected symbol value by determining a likelihood of a symbol having a first symbol value or a second symbol value and uses the likelihood of the symbol to select either the first symbol value or the second symbol value for the symbol.

11. A method, comprising:
    generating a set of a plurality of correlation signals;
    selecting a largest magnitude component from each plurality of correlation signals;
    using a complex correlation value associated with each selected largest magnitude component to select a symbol value of a symbol, the symbol value that has been selected being a selected symbol value;
    selecting a frequency error from a first frequency error or a second frequency error based on the selected symbol value; and
    using the frequency error to correct a frequency drift,
    wherein the frequency error is provided in feedback from a frequency shift keying (FSK) demodulator to a down-mixer to correct for frequency drift that occurs after initial frequency correction at an acquisition and frequency correction block,
    wherein the first frequency error is generated by calculating a first difference between a first phase component associated with a first future correlation value and a second phase component associated with a first previous correlation value, and wherein the second frequency error is generated by calculating a second difference between a third phase component associated with a second future correlation value and a fourth phase component associated with a second previous correlation value.

\* \* \* \* \*